(No Model.)
E. KOENIG.
MACHINE FOR SHAPING BUTTONS OF MOTHER OF PEARL.
No. 506,178. Patented Oct. 3, 1893.
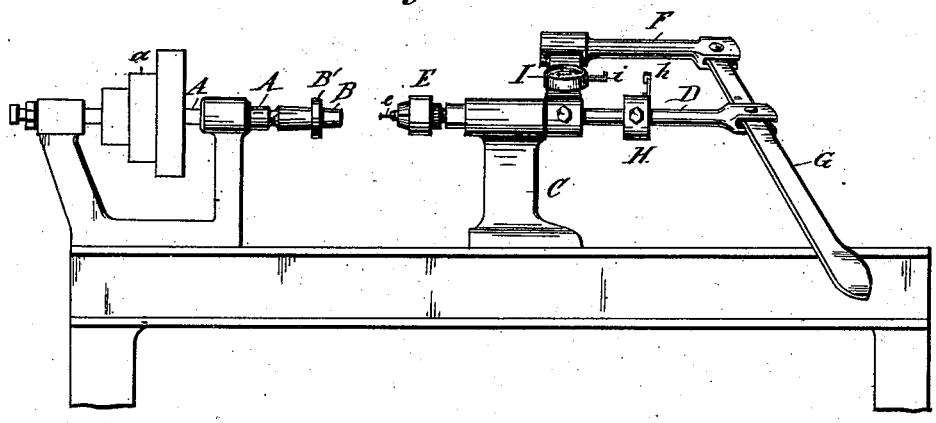
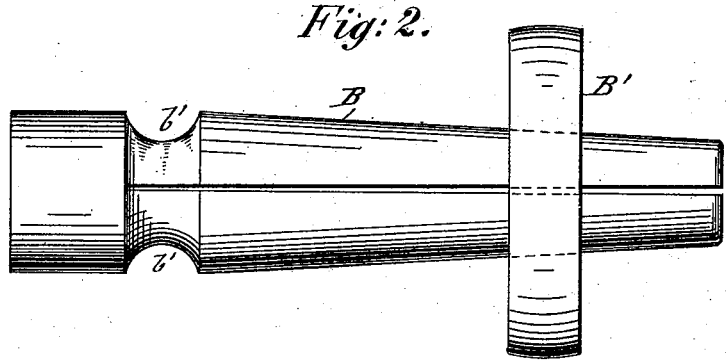
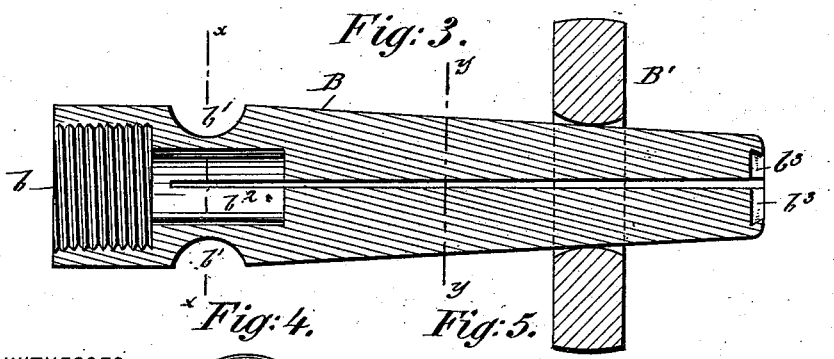
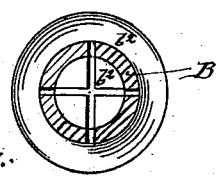
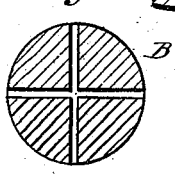
WITNESSES:
INVENTOR
ATTORNEY

United States Patent Office.

EMIL KOENIG, OF HICKSVILLE, ASSIGNOR TO EMIL SCHWEINBURG, OF NEW YORK, N. Y.

MACHINE FOR SHAPING BUTTONS OF MOTHER-OF-PEARL.

SPECIFICATION forming part of Letters Patent No. 506,178, dated October 3, 1893.

Application filed November 1, 1892. Serial No. 450,652. (No model.)

*To all whom it may concern:*

Be it known that I, EMIL KOENIG, a citizen of the United States, and a resident of Hicksville, in the county of Queens and State of New York, have invented certain new and useful Improvements in Machines for Shaping Buttons of Mother-of-Pearl, of which the following is a specification.

My invention has reference to improvements in machines for shaping buttons of mother of pearl and the invention consists of a chuck for holding the buttons to be shaped, which chuck is attached to a lathe and so constructed that the button, after being shaped by a suitable cutter, is easily removed from the said chuck and replaced by another button without the necessity for moving the chuck longitudinally.

Heretofore machines have been constructed wherein the cutting tools were stationary and the chucks were movable so that the button was clamped in the chuck and then moved toward the tool, but I have found that an objection to such construction existed in that it is more difficult to secure so small an article as a button within a movable chuck than within a stationary chuck. In some cases the tool has been movable as well as the chuck, but here the same objection existed. In many machines the jaws of the chuck are forced together through the agency of springs, which I also found objectionable because the springs might become weak or under great strain they might yield, and in my improved device the jaws are separated by spring action but are held together by positive force.

The construction of the machine with my improved chuck is illustrated in the accompanying drawings, in which—

Figure 1 is an elevation of a machine for shaping buttons of mother of pearl having my improved button holding chuck. Fig. 2 is a front view of the button holding chuck. Fig. 3 is a longitudinal section of the same and Figs. 4 and 5 are sections on lines $x$—$x$ and $y$—$y$ respectively of Fig. 3.

Similar letters of reference indicate corresponding parts.

A in the drawings is the shaft of a lathe immovable longitudinally, and to the screw-threaded end of which the chuck B for holding the buttons to be shaped is attached by means of the interior screw-thread $b$. The standard C of the lathe bears the shifting rod D which is provided with a chuck E for holding the cutter to impart to the button in the chuck B the proper shape. To the bracket F is pivoted a lever G which is fulcrumed to the forked end of the shifting rod D. A stop-device H is attached to the shifting rod by means of a set screw and provided with an arm $h$ that pushes against the spring acted push pin $i$ of the registering apparatus I that is fastened to the bracket F, as shown in Fig. 1.

The chuck B for holding the buttons is preferably made of brass, is conically shaped on its exterior and has an annular excavation $b'$ outside of and opposite to an inner bore $b^2$, as shown in Figs. 3 and 4. The chuck B is furthermore longitudinally cross-wise slitted, and the slits reach from the free end of the same inward to within the bore $b^2$. The free end of the said chuck is provided with a notch $b^3$, the side-edge of which is tapering against the outside, as shown in Fig. 3. The bore $b^2$ and the excavation $b'$ impart to the chuck arms an outward spring-action, so that the split portions of the same normally spread apart. To bring and keep these portions together a ring $B'$ of hard rubber is shifted upon the conical body of the chuck.

The machine works in the following manner: When the shaping cutter $e$ is fastened to the chuck E the ring $B'$ is shifted on the button-chuck B forward, so that the split portions of the chuck are somewhat spread apart and the button to be shaped placed in the notch $b^3$. The ring $B'$ is then normally shifted back so that the split portions of the chuck are pressed together and the button reliably held in the notch. After rotary motion is imparted to the shaft A and the chuck B by means of the pulley $a$, the lever G is moved to shift the rod D with the cutter $e$ in the chuck E against the button in the chuck B. The rotating motion of the shaft A causes the cutter $e$ to cut the desired shape into the button held by the said chuck B. The properly adjusted stopping device H prevents the cutter $e$ from cutting too deep into the button and that causes the action of the cutter to cease as soon as the stopping device abuts against the bracket F. The arm $h$ on the stopping device engages the push pin in the registering apparatus which registers the number of the shaped buttons. This registering apparatus may be of any approved construction. It will be seen from Fig. 3 that the hard rubber ring B' is rounded on all corners, and during the rotation of the chuck the operator may hold his hand upon or against this ring so as to steady it, to prevent its slipping to loosen the arms of the chuck, or to press it farther up the conical body and thus tighten the jaws just before the heaviest strain will be brought upon the rotating blank. When this ring is loose it may be held tight in the hand so that it will not rotate with the chuck, or it can be entirely removed when desired. The fact that the chuck has no longitudinal movement I consider important, because the button is not moved toward the tool but the tool toward the button, and hence the latter can be more firmly and accurately centered and rotated than if it were held in a chuck which had an axial as well as a rotary movement. When the button within the chuck B is shaped, the shifting rod D is moved back and the rotation of the shaft A stopped. The ring B' is then loosened on the said chuck B and the button removed from the notch $b^3$ which is automatically opened by the spring action of the split portions of the chuck. Another button is then placed into the said notch and the described action of the machine repeated. In this manner the buttons are more easily and quickly shaped than by any other machine for this purpose now in use.

Having thus described my invention, I claim as new and desire to secure by Letters Patent—

In a machine for shaping buttons, the combination with a tool, and means for moving it as desired; of a rotating shaft, and a chuck removably secured to said shaft, the chuck having an exterior annular excavation, an interior bore or cavity opposite said excavation, a body tapering from said excavation to its free end, said body being longitudinally slotted from the free end to within said bore to form arms and the free ends of said arms having notches for the purpose set forth; and a ring of hard rubber having its corners rounded and its interior aperture of a size to slide upon and closely fit said body, substantially as hereinbefore specified.

Signed at New York, in the county of New York and State of New York, this 28th day of October, A. D. 1892.

EMIL KOENIG.

Witnesses:
CHARLES KARP,
L. E. DRUMMOND.